US010661665B2

(12) United States Patent
Kazuno (10) Patent No.: US 10,661,665 B2
(45) Date of Patent: May 26, 2020

(54) TWO-POWER-SUPPLY LOAD DRIVING FUEL CELL SYSTEM

(71) Applicant: HONDA MOTOR CO., LTD., Tokyo (JP)

(72) Inventor: Shuichi Kazuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 15/034,676

(22) PCT Filed: Oct. 7, 2014

(86) PCT No.: PCT/JP2014/076791
§ 371 (c)(1),
(2) Date: May 5, 2016

(87) PCT Pub. No.: WO2015/068514
PCT Pub. Date: May 14, 2015

(65) Prior Publication Data
US 2016/0272086 A1  Sep. 22, 2016

(30) Foreign Application Priority Data

Nov. 8, 2013  (JP) ................................. 2013-231679

(51) Int. Cl.
*H02J 1/00* (2006.01)
*H02J 3/00* (2006.01)
(Continued)

(52) U.S. Cl.
CPC ......... *B60L 11/1887* (2013.01); *B60L 15/007* (2013.01); *B60L 50/51* (2019.02);
(Continued)

(58) Field of Classification Search
CPC .................... B60L 11/1887; B60L 11/1803
(Continued)

(56) References Cited

U.S. PATENT DOCUMENTS 5,494,881 A * 2/1996 MacHida ................. B01J 35/04
423/213.2
6,248,461 B1 * 6/2001 Abe ....................... H02J 7/0065
429/428

(Continued)

FOREIGN PATENT DOCUMENTS

JP  2000-260451 A  9/2000
JP  2006-351421 A  12/2006
(Continued)

OTHER PUBLICATIONS

International Search Report dated Dec. 9, 2014, issued in counterpart International Application No. PCT/JP2014/076791 (2 pages).
(Continued)

*Primary Examiner* — Metasebia T Retebo
(74) *Attorney, Agent, or Firm* — Westerman, Hattori, Daniels & Adrian, LLP (57) ABSTRACT

Provided is a two-power-supply load driving fuel cell system capable of improving the durability of the fuel cell and the power efficiency of the system. Even if the variation of a load terminal voltage occurs, the variation of the output terminal of an FC can be suppressed due to the high-speed operation of an FCVCU including an SiC-FET, enabling the durability of the FC to be ensured. In addition, since IGBTs are employed in a BATVCU having large average passing power, the power loss of a fuel cell system can be reduced. It is therefore possible to construct a system that takes advantage of the characteristics of the switching elements used in the FCVCU and the BATVCU.

5 Claims, 9 Drawing Sheets

(51) Int. Cl.

| | |
|---|---|
| *B60L 11/18* | (2006.01) |
| *H01M 8/04858* | (2016.01) |
| *H01M 10/46* | (2006.01) |
| *H01M 16/00* | (2006.01) |
| *B60L 15/00* | (2006.01) |
| *H02J 7/34* | (2006.01) |
| *B60L 58/40* | (2019.01) |
| *B60L 50/51* | (2019.01) |
| *H01M 8/04828* | (2016.01) |

(52) U.S. Cl.
CPC ........... *B60L 58/40* (2019.02); *H01M 8/0488* (2013.01); *H01M 8/0491* (2013.01); *H01M 8/0494* (2013.01); *H01M 8/04888* (2013.01); *H01M 8/04917* (2013.01); *H01M 8/04947* (2013.01); *H01M 10/46* (2013.01); *H01M 16/006* (2013.01); *H02J 7/34* (2013.01); *B60L 2210/10* (2013.01); *B60L 2210/40* (2013.01); *H01M 2250/20* (2013.01); *H02J 2300/30* (2020.01); *Y02T 10/645* (2013.01); *Y02T 10/7216* (2013.01); *Y02T 10/7241* (2013.01); *Y02T 90/32* (2013.01); *Y02T 90/34* (2013.01)

(58) Field of Classification Search
USPC ..................................................... 307/74–76
See application file for complete search history.

(56) References Cited

U.S. PATENT DOCUMENTS

| | | | |
|---|---|---|---|
| 9,711,988 B2* | 7/2017 | Toya ................. | H01M 8/04619 |
| 2006/0240291 A1* | 10/2006 | Kim .................. | H01M 8/04559 |
| | | | 429/9 |
| 2010/0332063 A1* | 12/2010 | Saeki ........................ | B60L 3/00 |
| | | | 701/22 |
| 2011/0064976 A1 | 3/2011 | Shimoda | |
| 2011/0190959 A1* | 8/2011 | Manabe ............. | H01M 8/0488 |
| | | | 700/298 |
| 2012/0086278 A1* | 4/2012 | Kanie ................ | H01M 8/04559 |
| | | | 307/66 |
| 2013/0143181 A1* | 6/2013 | Greenberg ............ | G09B 9/042 |
| | | | 434/62 |
| 2013/0169253 A1 | 7/2013 | Kaneko | |

FOREIGN PATENT DOCUMENTS

| | | |
|---|---|---|
| JP | 2011-66973 A | 3/2011 |
| JP | 2012-244714 A | 12/2012 |
| WO | 2013/021476 A1 | 2/2013 |

OTHER PUBLICATIONS

Office Action dated Dec. 6, 2016, issued in counterpart Japanese Patent Application No. 2015-546567, with English translation. (4 pages).

* cited by examiner

TWO-POWER-SUPPLY LOAD DRIVING FUEL CELL SYSTEM

TECHNICAL FIELD

The present invention relates to a two-power-supply load driving fuel cell system, in which a load is driven by a fuel cell and an electrical storage device, and for example, relates to a two-power-supply load driving fuel cell system applied to a fuel cell vehicle in which the load is a motor for the purpose of vehicle traveling.

BACKGROUND ART

Heretofore, as shown in FIG. 1 of Japanese Laid-Open Patent Publication No. 2006-351421 (hereinafter referred to as JP2006-351421A), a power supply circuit is known, in which voltage boosters (a first current/voltage control device and a second current/voltage control device made up from chopper-type DC/DC converters) are disposed respectively at the output terminals of a fuel cell, and at the terminals (input/output terminals) of an electrical storage device.

By using the power supply circuit which is configured in the foregoing manner, since the voltage (applied voltage), which is applied to the load from the fuel cell and the electrical storage device, can be freely adjusted by the voltage boosters, an advantage exists in that a combined output power of the fuel cell and the electrical storage device can suitably be made to track with respect to a demanded power of the load of a system in which a fuel cell system is mounted, for example, a system in which load fluctuations are intense such as a fuel cell vehicle.

According to the above-described power supply circuit, because the voltage booster is used, at the output terminals of the fuel cell, the number of cells of the fuel cell can be reduced, and it is possible for the fuel cell equipment to be made smaller in volume and to realize a reduction in costs.

SUMMARY OF INVENTION

However, with the fuel cell system disclosed in JP2006-351421A, a problem occurs in that, since the power supplied to the load from both power supplies (the fuel cell and the electrical storage device) must necessarily pass through the voltage boosters, power efficiency is deteriorated due to losses in the voltage boosters, compared to a case in which such voltage boosters do not intervene.

The present invention has been devised taking into consideration the aforementioned problems, and has the object of providing a two-power-supply load driving fuel cell system, in which a voltage booster is disposed at the output terminals of a fuel cell, and a voltage step-up/step-down unit is disposed at the terminals of an electrical storage device, and wherein durability of the fuel cell and power efficiency of the system can be improved.

A two-power-supply load driving fuel cell system according to the present invention, in which a load is driven by a fuel cell and an electrical storage device, comprises a first power conversion device disposed at output terminals of the fuel cell, and a second power conversion device disposed at terminals of the electrical storage device, wherein the first power conversion device is constituted by a switching element including a silicon carbide field effect transistor (referred to as an SiC-FET), the second power conversion device is constituted by a switching element made up from an insulated gate bipolar transistor (referred to as an IGBT), a maximum current value of the fuel cell is set to be higher than a maximum current value of the electrical storage device, and furthermore, in a predetermined driving mode, a voltage value of the fuel cell is set to be lower than a voltage value of the electrical storage device, and an average passing power value of the second power conversion device is set to be higher than an average passing power value of the first power conversion device.

According to the present invention, because the first power conversion device is used at the output terminals of the fuel cell, the number of cells of the fuel cell can be reduced, and it is possible to realize a system of small capacity and a reduction in costs, together with enabling the voltage and current of the SiC-FET to be controlled precisely. Further, since switching losses are reduced with the SiC-FET in comparison with an IGBT, power from the fuel cell can be supplied efficiently to the load.

Furthermore, since the IGBT, which is higher in reliability in comparison with a SiC-FET, is arranged in the second power conversion device disposed at the terminals of the electrical storage device, compared to the first power conversion device, a larger passing power can be supplied stably to the load through the second power conversion device from the electrical storage device.

More specifically, a system can be constructed in which the respective characteristics of the switching element (SiC-FET) of the first power conversion device and the switching element (IGBT) of the second power conversion device are taken advantage of.

In this case, preferably, a lower limit power is set in the fuel cell, such that when a demanded power of the load is less than or equal to the lower limit power, a generated power of the fuel cell is the lower limit power, and responsive to a variation in the demanded power of the load, a charging power to the electrical storage device is changed, whereas, in a case that the demanded power of the load exceeds the lower limit power, the first power conversion device is controlled so that the generated power of the fuel cell is linked to the variation in the demanded power of the load.

In this manner, when the demanded power of the load is less than or equal to the lower limit power of the fuel cell, the fuel cell can generate power regularly at the lower limit power corresponding to a fixed load, while at a time of high load output, electrical power from the fuel cell can be drawn out by the highly responsive first power conversion device. Accordingly, a system can be constructed which has high durability of the fuel cell and is highly responsive to variations in the demanded power of the load.

The lower limit power of the fuel cell preferably is set to a value that is less than or equal to the average passing power value of the second power conversion device. If handled in this manner, since stoppage of power from the fuel cell by excessive charging of the electrical storage device is suppressed, degradation of the fuel cell can be prevented, and a highly durable fuel cell system can be constructed.

In this case, the first power conversion device preferably is constituted by a switching element including an IGBT in addition to the SiC-FET, and is controlled so that, when the load is a low load, only the SiC-FET switching element is placed in an operating state, and when the load is a high load, both the SiC-FET switching element and the IGBT switching element are placed in an operating state.

Moreover, even when the load is a low load, in a case that the temperature of the SiC-FET switching element is greater than or equal to a threshold temperature, both the SiC-FET switching element and the IGBT switching element are controlled so as to be placed in an operating state. Thus, it is possible to suppress a rise in temperature of the SiC-FET switching element.

The predetermined driving mode may be a driving pattern for exhaust gas measurement.

According to the present invention, because the first power conversion device is used at the output, terminals of the fuel cell, the number of cells of the fuel cell can be reduced, and it is possible to realize a system of small capacity and a reduction in costs. Together therewith, even if there are fluctuations (load variations) in the load terminal voltage, the voltage and current can be controlled precisely based on the high speed operation of the SiC-FET. Further, since switching losses are reduced with the SiC-FET in comparison with an IGBT, power from the fuel cell can be supplied highly efficiently to the load.

Furthermore, since the IGBT, which is higher in reliability in comparison with a SiC-FET, is arranged in the second power conversion device disposed at the terminals of the electrical storage device, compared to the first power conversion device disposed at the output terminals of the fuel cell, a larger passing power can be supplied stably to the load.

More specifically, an advantage is achieved in that a system can be constructed in which the respective characteristics of the switching element (SiC-FET) of the first power conversion device, which is disposed at the output terminals of the fuel cell, and the switching element (IGBT) of the second power conversion device, which is disposed at the terminals of the electrical storage device, are taken advantage of.

DESCRIPTION OF EMBODIMENTS

Below, concerning a two-power-supply load driving fuel cell system according to the present invention, a preferred embodiment in relation to a fuel cell vehicle to which the two-power-supply load driving fuel cell system according to the present embodiment is applied will be described in detail with reference to the accompanying drawings.

Figure 1:
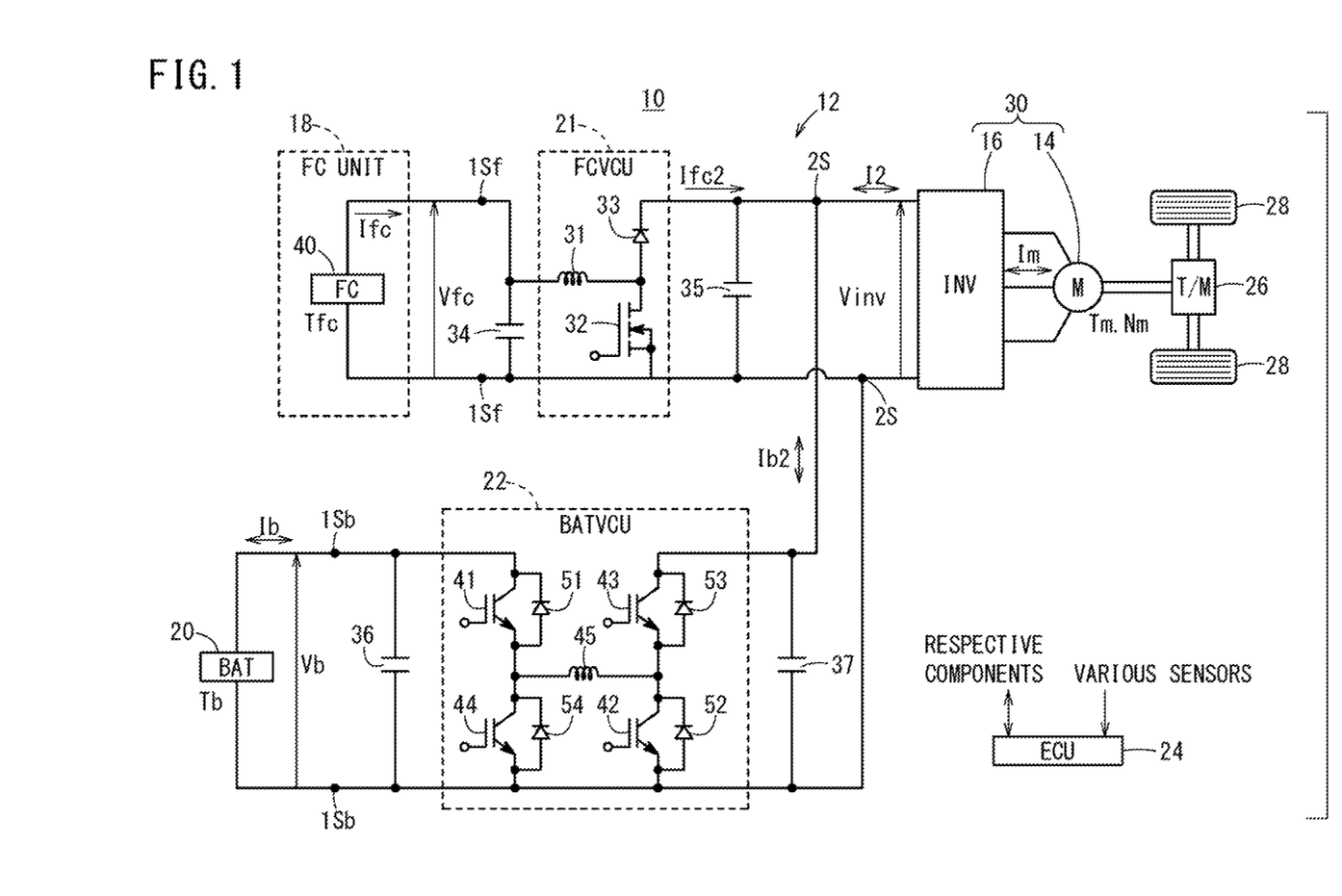
FIG. 1 is an outline overall schematic view of a fuel cell vehicle, to which the two-power-supply load driving fuel cell system according to an embodiment of the present invention is applied.

FIG. 1 is an outline overall schematic view of a fuel cell vehicle 10 (hereinafter referred to as an "FC vehicle 10" or a "vehicle 10"), to which a fuel cell system 12 (hereinafter referred to as an "FC system 12") as a two-power-supply load driving fuel cell system according to an embodiment of the present invention is applied.

The FC vehicle 10 includes the FC system 12, a drive motor 14 (hereinafter referred to as a "motor 14") which is a traction motor used for running the vehicle, and a load driving circuit 16 (hereinafter referred to as INV 16, where INV implies an inverter).

More specifically, the FC system 12 includes a fuel cell unit 18 (hereinafter referred to as an "FC unit 18") arranged on one primary side 1Sf, a high voltage battery 20 (hereinafter referred to as a "BAT 20") (electrical storage device) arranged on another primary side 1Sb, a chopper type voltage boosting (step-up) converter (voltage booster) 21 (hereinafter referred to as an FCVCU 21 where VCU implies a voltage control unit) as a flat power converting device disposed between the primary side 1Sf and a secondary side 2S, a chopper type step-up/step-down converter 22 (hereinafter referred to as a BATVCU 22) as a second power converting device disposed between the primary side 1Sb and the secondary side 2S, and an electronic control device 24 (hereinafter referred to as an ECU 24, where ECU implies an electronic control unit).

The motor 14 generates a drive power based on the combined power supplied from the FC unit 18 and the BAT 20. Vehicle wheels 28 are rotated through a transmission 26 by the drive power.

The INV 16 is configured as a 3-phase bridge type, and carries out DC/AC conversion. The load terminal voltage Vinv [V], which is a DC voltage from an FC 40 and/or the BAT 20 that is boosted through the FCVCU 21 and/or the BATVCU 22, is converted into a 3-phase AC voltage and supplied to the motor 14. On the other hand, the load terminal voltage Vinv, after AC/DC conversion thereof accompanying a regenerative operation of the motor 14, is supplied (for carrying out charging) through the BATVCU 22 to the BAT 20.

The FC unit 18, in addition to the FC 40, as is widely known, comprises a hydrogen tank (not shown) to which hydrogen gas (fuel gas) is supplied with respect to anode flow fields (not shown) of the FC 40, an air pump (not shown) to which air (an oxygen-containing gas) containing oxygen is supplied with respect to cathode flow fields (not shown) of the FC 40, and a water pump (not shown) to which a cooling medium (coolant) is supplied with respect to coolant flow fields of the FC 40.

The FC 40, for example, includes a stacked structure in which cells of the fuel cell (hereinafter referred to as "FC cells") are stacked, each of which is formed by sandwiching from both sides an electrolyte membrane between an anode and a cathode. A hydrogen containing gas, which is supplied to the anodes through the anode flow fields, is subjected to hydrogen ionization on an electrode catalyst and moves to the cathodes through the electrolyte membrane. Electrons, which are generated during such movement, are taken out to an external circuit, and are used as electrical energy, which generates a DC voltage Vfc (hereinafter referred to as an FC generated voltage Vfc). Since the oxygen-containing gas is supplied through the cathode flow field to each of the cathodes, at the cathodes, water is produced by reactions between the hydrogen ions, the electrons, and oxygen gas.

By production of water, a moistened state of the electrolyte membrane, more specifically, a state in which membrane humidity is high, can be maintained. Thus, the reactions can be carried out smoothly.

Electrical power from the FC 40 (hereinafter referred to as FC generated power Pfc, Pfc=Vfc×Ifc, where Ifc implies an FC generated current) is supplied to the motor 14 (in power running time) through the INV 16, wherein the FC generated voltage Vfc is boosted in voltage through the FCVCU 21. Together therewith, responsive to the power condition of the FC system 12, the FC generated voltage Vfc is supplied to the BAT 20 for charging thereof from the FC 40 and through the FCVCU 21 and the BATVCU 22.

On the other hand, power from the BAT 20 (hereinafter referred to as BAT power Pbat) is supplied (in power running time) to the motor 14 through the INV 16, wherein the battery voltage Vb is boosted in voltage through the BATVCU 22.

The BAT 20 is an electrical storage device (energy storage) including a plurality of battery cells, and for example, can make use of a lithium ion secondary battery, a nickel-hydrogen secondary battery, or a capacitor or the like. According to the present embodiment, a lithium ion secondary battery is used.

The motor 14 and the INV 16 taken in combination are referred to as a load 30. In practice, in the load 30, apart from the motor 14, etc., there are included respective auxiliary loads, such as an air pump and a water pump used for driving the FC 40, and an air conditioner for performing air conditioning in the interior of the vehicle, etc.

The FCVCU 21 is constituted from a reactor 31, a SiC-FET (silicon carbide field effect transistor) 32 (SiC-MOSFET) that serves as a switching element, and a diode 33. Based on the demanded power of the load 30, the SiC-FET 32 is subjected to an on/off switching control (duty control) through the ECU 24, whereby the FC generated voltage Vfc is boosted in voltage to a predetermined load terminal voltage Vinv.

The BATVCU 22 is an H-bridge type DC/DC converter, and is constituted from a reactor 45, IGBTs (insulated gate bipolar transistors) 41 to 44 that serve as switching elements, and diodes 51 to 54, which are connected in a reverse direction and in parallel, respectively, with the IGBTs 41 to 44.

In the BATVCU 22, at times that the load terminal voltage Vinv is stepped up or boosted to a voltage higher than the battery voltage Vb, by operation of the ECU 24, under a condition in which the IGBT 41 is turned on and the IGBT 44 is turned off, the IGBT 42 and the IGBT 43 are turned on and off alternately (an on/off switching control is performed), whereby the battery voltage Vb (stored voltage) is boosted to the predetermined load terminal voltage Vinv, which is higher than the battery voltage Vb.

In the BATVCU 22, at times that the load terminal voltage Vim' is stepped down or decreases in voltage to a battery voltage Vb that is lower than the load terminal voltage Vinv, by operation of the ECU 24, under a condition in which IGBTs 41, 42, 44 are turned off, the IGBT 43 is turned on and off (an on/off switching control is performed), whereby the load terminal voltage Vinv decreases in voltage to the battery voltage Vb of the BAT 20.

Further, in the FCVCU 21 and the BATVCU 22, smoothing capacitors 34 to 37 are arranged, respectively, between the primary side 1Sf, 1Sf, between the primary side 1Sb, 1Sb, and between the secondary side 2S, 2S.

The ECU 24 controls the respective components of the motor 14, the INV 16, the FC unit 18, the BAT 20, the FCVCU 21, and the BATVCU 22, etc., through non-illustrated communication lines. When such controls are performed, a program which is stored in a memory (ROM) of the ECU 24 is executed. Further, in the controls, detection values are used from each of various sensors (voltage sensors, current sensors, temperature sensors, and a rotational speed sensor, etc.). The detection values include the FC generated voltage Vfc, the FC generated current Ifc, the FC temperature Tfc (the temperature of the coolant that is circulated by a water pump or the like) of the FC 40, the battery voltage Vb, the battery current (discharge current and charging current) Ib, the battery temperature Tb of the BAT 20, the load terminal voltage Vinv, and the secondary current I2 of the INV 16, the motor current Im, the motor temperature Tm, and the motor rotational speed Nm, etc.

Among the various sensors, in addition to the sensors mentioned above, there is included an input/output sensor associated with traveling of the vehicle 10, such as an accelerator pedal opening sensor and a motor rotational speed sensor, etc.

The ECU 24 is a computing machine including a microcomputer, and includes a CPU (Central Processing Unit), memories including a ROM (such as an EEPROM) and a RAM (Random Access Memory), input/output devices including an A/D converter, a D/A converter, etc., and a timer as a timing means. The CPU reads and executes programs stored in the ROM to function as various function performing sections (function performing means), for example, a controller, a calculator, a processor, etc. The ECU 24 need not be constituted from a single ECU, but can be constituted from a plurality of ECDs for each of the motor 14, the FC unit 18, the BAT 20, the FCVCU 21, and the BATVCU 22, or alternatively, can be constituted from an integrated ECU that carries out controls by integrating the plurality of ECUs together.

The ECU 24 determines, while adjusting, the distribution (allocation) of the loads (load power) to be borne by the FC 40, the load (load power) to be borne by the BAT 20, and the load (load power) to be borne by the regenerative power supply (motor 14), from the load (load power) that is demanded by the FC system 12 as the FC vehicle 10 in its entirety, which is determined based on the state of the FC 40, the state of the BAT 20, and the state of the motor 14, in addition to inputs (load requests) from the various switches and sensors. The ECU 24 dispatches commands to the motor 14, the INV 16, the FC unit 18, the BAT 20, the FCVCU 21, and the BATVCU 22.

The FC vehicle 10, to which the fuel cell system 12 according to the present embodiment is applied, is configured basically as described above.

Next, a description will be given concerning the technical reasons as to why the FCVCU 21 is configured to include the SiC-FET 32 as a switching element, and the BATVCU 22 is configured to be made up from the IGBTs 41 to 44 as switching elements.

Figure 2:
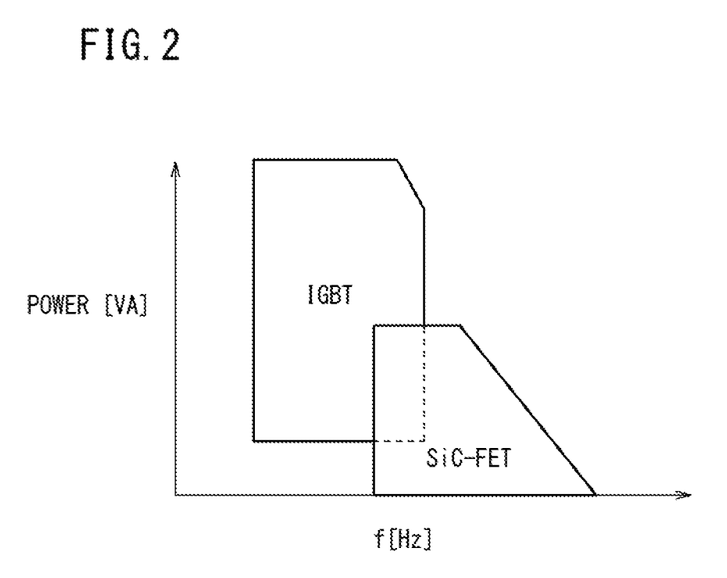
FIG. 2 is a characteristic diagram of the frequency and power of power devices (SiC-FET and IGBT)

FIG. 2 illustrates the frequency and power characteristics of the SiC-FET 32 and the IGBTs 41 to 44, which serve as power devices. It is noted that, in comparison with the IGBTs, the SiC-FET can be used up to a higher operating frequency f [Hz], and therefore, the SiC-FET is capable of performing accurate switching operations at high speeds, switching losses are small in comparison with the IGBTs, and voltage boosting can be performed efficiently thereby. On the other hand, concerning the IGBTs, it is noted that, although the operating frequency f [Hz] at which they can be used is lower than that of the SiC-FET, in comparison with the SiC-FET, from the standpoints of heat resistance and the withstand voltage thereof as well, the IGBTs are capable of passing a large power [VA] in a stable manner, and the reliability thereof is high. At the present time, concerning costs, SiC-FETs are of a higher cost than IGBTs.

Figure 3:
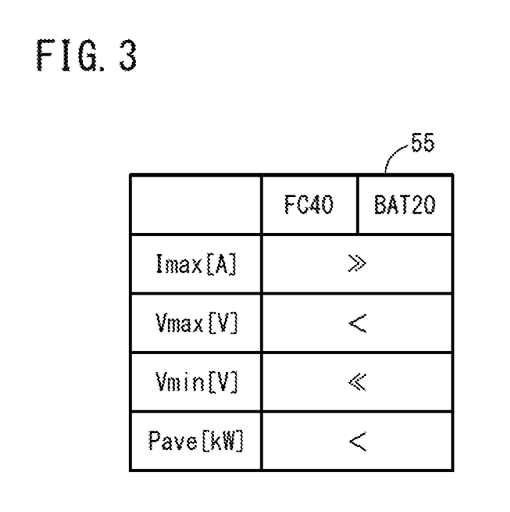
FIG. 3 is a specification comparison chart of a fuel cell and a high voltage battery.

In FIG. 3, there is shown a specification comparison chart 55 of the FC 40 and the BAT 20. A maximum current Imax of the FC 40 is set (selected) so that a current of several hundreds of amperes, which is on the order of two times that of the BAT 20, can flow therethrough. Although the maximum voltages Vmax of the FC 40 and the BAT 20 are both several hundreds of volts, the maximum voltage Vmax of the BAT 20 is set (selected) to be higher than that of the FC 40.

The minimum voltage Vmin of the FC 40 is a voltage that is less than or equal to 100 volts, and the minimum voltage Vmin of the BAT 20 is a voltage that is on the order of three times that of the FC 40. The used average power Pave is set (selected) so that, although both are on the order of several kilowatts, the average power Pave of the BAT 20 is greater than that of the FC 40. The used average power Pave of the BAT 20 is an average value of the absolute value of the charge that is discharged or used for charging.

Figure 4:
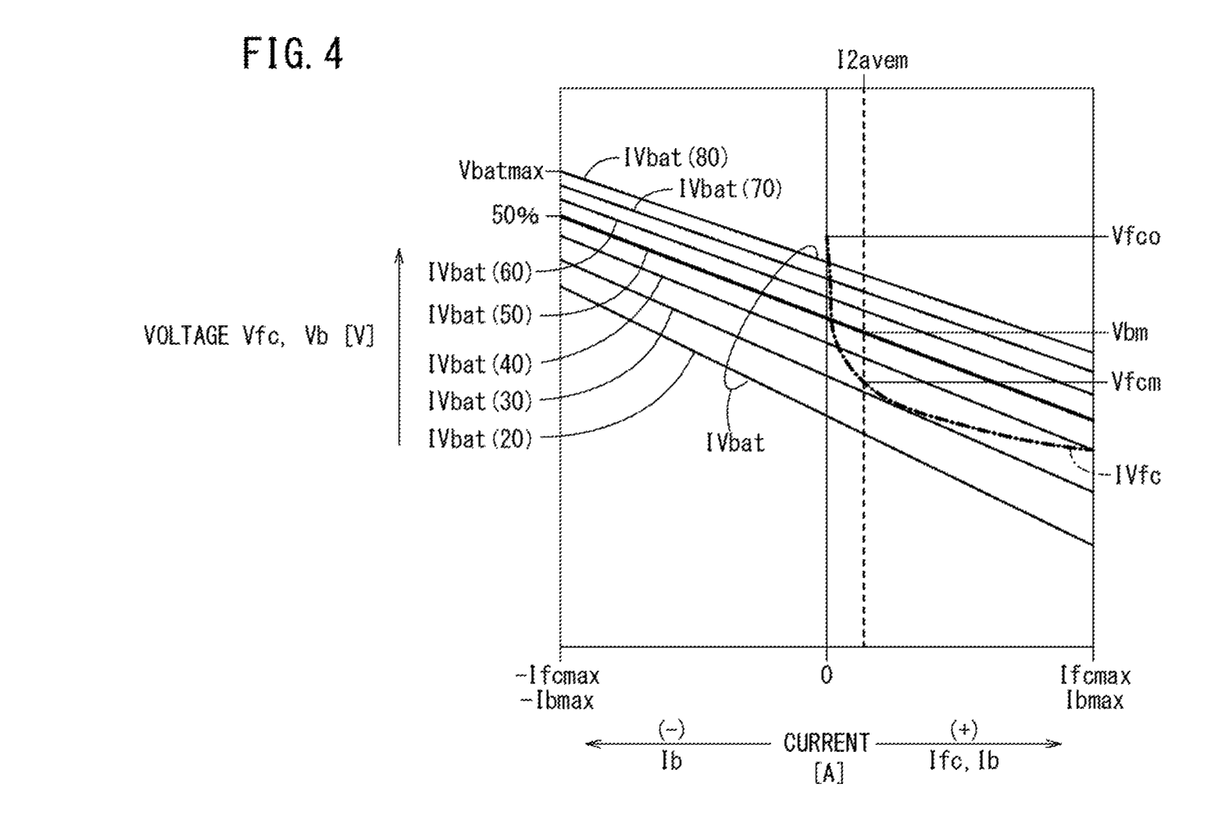
FIG. 4 is a characteristic diagram of current and voltage in a state in which the fuel cell and the high voltage battery are actually in use.

In FIG. 4, current and voltage characteristics during actual use of the FC 40 and the BAT 20 are shown. In the FC current-voltage characteristic IVfc shown by the one-dot-dashed bold line, the FC generated current Ifc is Ifc=0 [A]. More specifically, a characteristic is revealed in which the FC generated voltage Vfc at a time that the FC generated current Ifc is not taken out becomes the FC open end voltage Vfco (Vfc=Vfco), and the FC generated voltage Vfc decreases as the FC generated current Ifc increases. Moreover, in the FC 40, the FC generated current Ifc is controlled (determined) by controlling (determining) the FC generated voltage Vfc.

On the other hand, the BAT voltage and current characteristic IVbat (50) shown by the bold solid line indicates a characteristic when the SOC (state of charge) is 50 [%], and by the ECU 24, energy management of a charging and discharging control is carried out so that, on average, the SOC of the BAT 20 that is mounted in the fuel cell vehicle 10 becomes SOC=50 [%]. The BAT voltage and current characteristics IVbat (80), (70), (60), (40), (30), and (20) indicate characteristics at times that the SOC is 80%, 70%, 60%, 40%, 30%, and 20%, respectively.

The predetermined driving mode according to the present embodiment is an LA-4 mode. The LA-4 mode is a driving pattern for exhaust gas measurement adopted in America, Canada, Australia, and some of the countries of Europe. In addition to city driving, high speed driving is included in part. The predetermined driving mode is not limited to the LA-4 mode, and in addition to the JC08 mode and the 10-15 mode of Japan, may be the UDC+EUDC mode of Europe.

In FIG. 4, the FC generated voltage Vfc at a mode driving average current value of I2avem according to the LA-4 mode is Vfc=Vfcm on the FC current-voltage characteristic IVfc, and the BAT voltage Vb at a mode driving average current value of I2avem is Vb=Vbm on the BAT voltage and current characteristic IVbat (50).

It should be noted that, in practice, the ECU 24 carries out energy management, so that the SOC of the BAT 20 becomes SOC=50 [%], and therefore, the balance of the battery current Ib of the BAT 20 is 0 [A] (in the case that the discharge current is positive and the charging current is negative), and the mode driving average current I2avem, in essence, is a current that is supplied to the load 30 from the FC 40 through the FCVCU 21.

Figure 5:
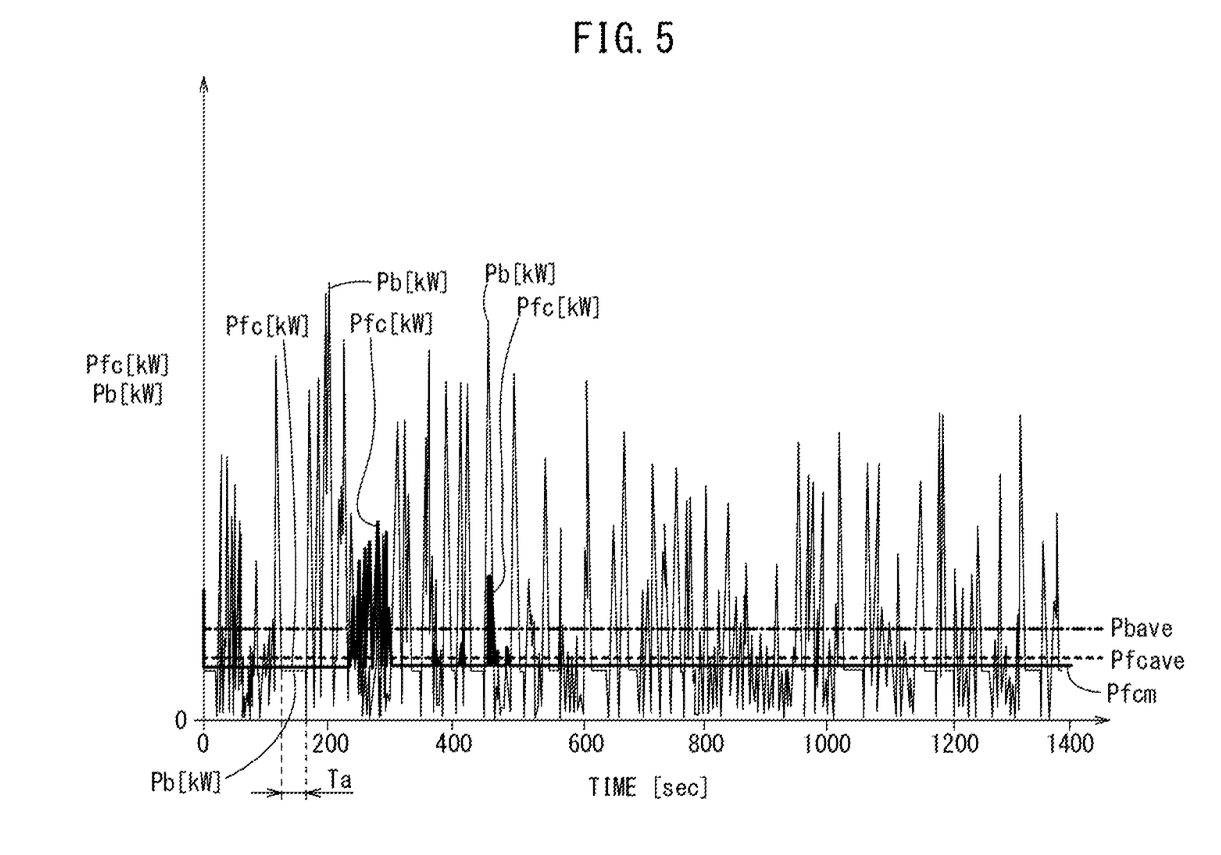
FIG. 5 is a timing chart under times of mode driving which is used to provide a description of operations (in comparison with used average power) of the embodiment.

In FIG. 5, during LA-4 mode traveling (LA-4 mode driving), from a time of 0 [sec] to a time of 1400 [sec], there is shown a change (bold solid line) of the FC generated power Pfc [kW] of the FC 40, and a change (thin solid line) of the BAT power Pb [kW] of the BAT 20. Since both charging and discharging occur therein, the BAT power Pb [kW] signifies a power defined by respective absolute values of a positive (discharging) power and a negative (charging) power (see FIG. 4).

During mode driving, in the FC 40, power is generated regularly, while taking a steady FC power Pfcm (Pfc=Pfcm) of a constant value to be a lower limit power. In practice, in FIG. 4, the FC voltage Vfcm is constant, and a power, which is obtained by multiplying the FC voltage Vfcm (also referred to as a steady FC voltage Vfcm) by the corresponding FC generated current Ifc, becomes the steady FC power Pfcm=Ifc×Vfcm.

For example, during a time period Ta prior to the time of 200 [sec], because the steady FC power Pfcm and the BAT power Pb are of equal values, it is understood to be a period during which the BAT 20 is charged by the FC generated power Pfc. Further, at a time of high load such as when the vehicle 10 is accelerating or the like, after the time of 200 [sec] up to a time in the vicinity of 300 [sec], a large amount of power is generated by the FC generated power Pfc [kW] (the FC generated current Ifc becomes a large current, and the FC generated voltage Vfc becomes low). In this case, since the SiC-FET 32 is used as the switching element of the FCVCD 21, high frequency switching is possible, and a high precision current control can be carried out.

To explain in greater detail, at a time of high load when the motor current Im supplied to the motor 14 is high, the load terminal voltage Vinv (output voltage of the FCVCD 21) is a high voltage required under the boosting operation of the BATVCU 22, whereas in order that, the FC generated power Vfc of the FC 40 exhibits a large current output (high current FC generated current Ifc), it is necessary to be maintained on the low voltage side (refer to the FC current-voltage characteristic IVfc of FIG. 4). Therefore, although it is necessary for the boosting or step-up ratio (Vinv/Vfc) of the FCVCU 21 to increase sharply, because the SiC-FET 32 is used, high frequency switching is enabled, and a high precision current control responsive to the supplied motor current Im can be carried out.

Furthermore, during the time that, the FC 40 generates power at the steady FC power Pfcm, although the duty ratio of the FCVCU 21 is controlled at high speed so that the steady FC voltage Vfcm is maintained even as the load terminal voltage Vinv is varied, since the SiC-FET 32 is used, it is possible for the steady FC voltage Vfcm to be maintained in line with the high speed control.

In FIG. 5, as shown by the dashed line, the FC average power Pfcave [kW] at the time of mode driving becomes a power that is larger than the steady FC power Pfcm (Pfcave>Pfcm).

At the time of mode driving, the average passing power Pbave [kW] of the BAT 20 (BATVCU 22) becomes a power that is larger than the FC average power Pfcave [kW].

SUMMARY OF EMBODIMENT

As described above, the fuel cell system 12 as a two-power-supply load driving fuel cell system according to the above-described embodiment is a system in which the load 30 is driven by the FC 40 and the BAT 20 (electrical storage device). The fuel cell system 12 is equipped with the FCVCU 21 as a first power conversion device (voltage booster) that is disposed at the output terminals of the FC 40, and the BATVCU 22 as a second power conversion device (voltage step-up/step-down unit) that is disposed at the terminals of the BAT 20.

The FCVCU 21 is constituted by a switching element including the SiC-FET 32, and the BATVCU 22 is constituted by a switching element made up from the IGBTs 41 to 44. The maximum current value of the FC 40 (Imax [A] in FIG. 3) is set to be higher than the maximum current value of the BAT 20 (Imax [A] in FIG. 3), and furthermore, in a predetermined driving mode, i.e., in the LA-4 driving mode according to the present embodiment, the average passing power value (Pbave in FIG. 5) of the BATVCU 22 (IGBTs 41 to 44) is set to be higher than the average passing power value (Pfcave in FIG. 5) of the FCVCU 21.

In this manner, because the FCVCU 21 is used at the output terminals of the FC 40, the number of cells of the FC 40 can be reduced, and it is possible to realize a system of small capacity and a reduction in costs. Together therewith, even if there are fluctuations (load variations) in the load terminal voltage Vinv, by high speed operation of the FCVCU 21 (first power conversion device) including the SiC-FET 32, fluctuations in the output terminal voltage (FC generated voltage Vfc) of the FC 40 can be suppressed, and durability of the FC 40 can be assured. Further, since the IGBTs 41 to 44 are arranged in the BATVCU 22 that has a large average passing power Pbave (average passing power value), power losses in the fuel cell system 12 can be reduced, and a system can be constructed in which the characteristics of the switching elements (SiC-FET or IGBTs) of the FCVCU 21 and the BATVCU 22 are taken advantage of.

In this case, in the FC 40, the steady FC power Pfcm is set as the lower limit power (see FIG. 5), and when the demanded power of the load 30 is less than or equal to the lower limit power (steady FC power Pfcm), the FC 40 generates power at the lower limit power (steady FC power Pfcm), and a portion of the power of the FC 40 in excess of the lower limit power (steady FC power Pfcm) is utilized for charging the BAT 20 (for example, during the time period Ta in FIG. 5).

On the other hand, in the case that the demanded power of the load 30 is in excess of the lower limit power (steady FC power Pfcm) of the FC 40, and the BAT 20 is in a low SOC condition (according to the present invention, when the SOC is less than 50 [%]), the FCVCU 21 is controlled so that the FC generated power Pfc of the FC 40 is linked to or follows the variation (rise) in the demanded power of the load 30 (from after the time of 200 [sec] up to the vicinity of the time of 300 [sec] or the like).

In this manner, the FC 40 is capable of generating power regularly at the lower limit power (steady FC power Pfcm) corresponding to a fixed load, while at a time of high output, electrical power from the FC 40 can be drawn out by the FCVCU 21, which is equipped with the SiC-FET 32, the responsiveness of which is high. Accordingly, a system can be constructed which has high durability of the FC 40 and is highly responsive to variations in the demanded power of the load. Thus, the system is suitable for application to the fuel cell vehicle 10.

The lower limit power (steady FC power Pfcm) of the FC 40 preferably is set to a value that is less than or equal to the passing power (average passing power Pbave) of the IGBTs 41 to 44 that constitute the BATVCU 22 disposed at the input/output terminals of the BAT 20. If handled in this manner, since stoppage of power from the FC 40 by excessive charging of the BAT 20 is suppressed, degradation of the FC 40 can be prevented, and a highly durable fuel cell system 12 can be constructed.

Other Embodiment

Figure 6:
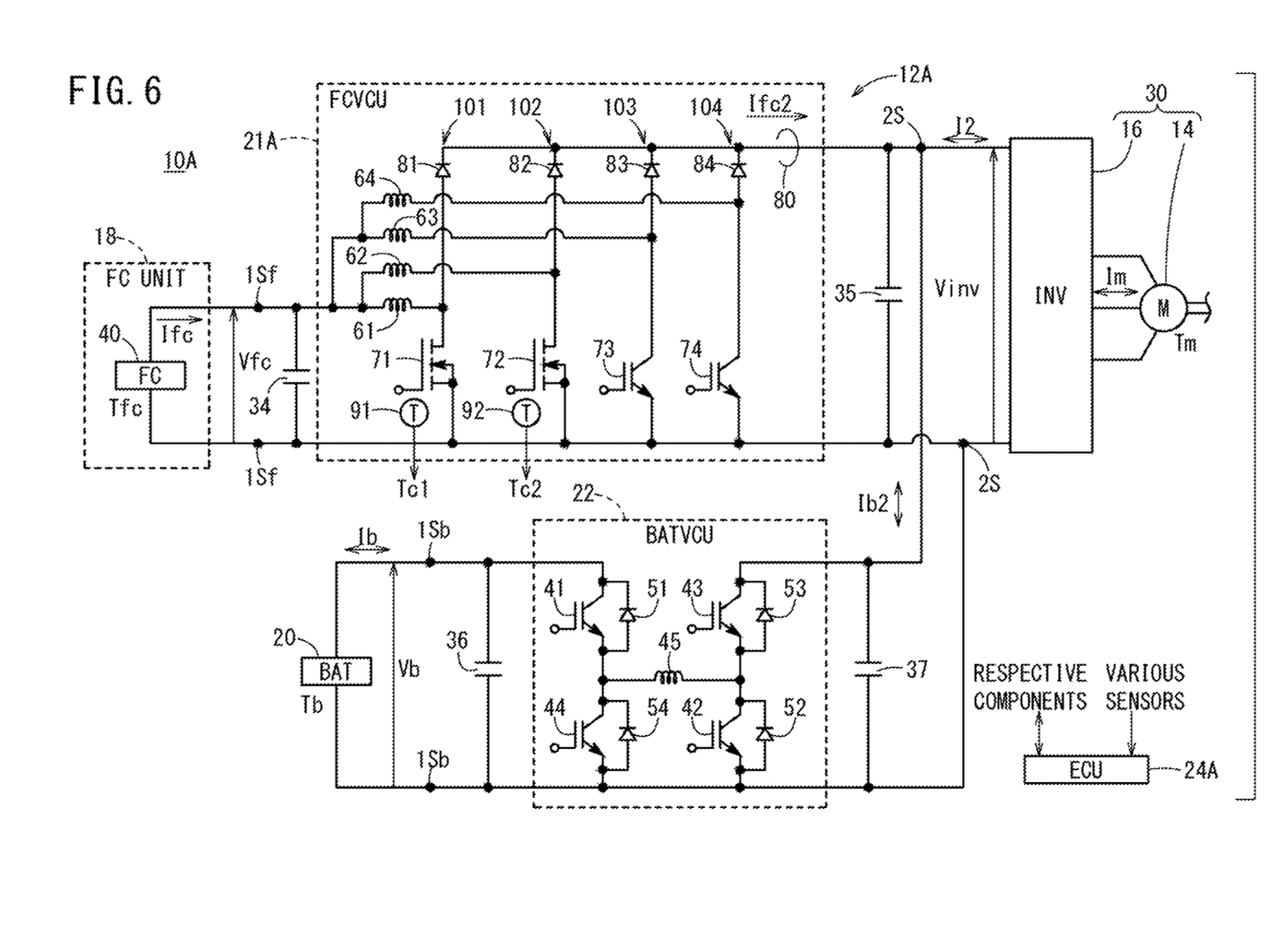
FIG. 6 is an outline overall schematic view of a fuel cell vehicle, to which the two-power-supply load driving fuel cell system according to another embodiment of the present invention is applied.

FIG. 6 is an outline overall schematic view of a fuel cell vehicle 10A (hereinafter referred to as an "FC vehicle 10A" or a "vehicle 10A"), to which a fuel cell system 12A (hereinafter referred to as an "FC system 12A") as a two-power-supply load driving fuel cell system according to another embodiment of the present invention is applied. In the FC vehicle 10A shown in FIG. 6, constituent elements which are the same as those of the FC vehicle 10 shown in FIG. 1 are denoted by the same reference characters, and detailed description thereof is omitted. However, the basic difference between the embodiments is that the FCVCU 21 is changed to an FCVCU 21A.

The FCVCU 21A, which is a chopper type voltage boosting converter (voltage booster) serving as the first power conversion device, is constituted by four parallel VCUs including a first phase VCD 101, a second phase VCU 102, a third phase VCU 103, and a fourth phase VCU 104.

The first phase VCU 101 is constituted from a reactor 61, a SiC-FET 71 as a switching element, and a diode 81.

The second phase VCU 102 possesses the same elements and the same circuit configuration as the first phase VCU 101, and is constituted from a reactor 62, a SiC-FET 72 as a switching element, and a diode 82.

The third phase VCU 103 is constituted from a reactor 63, an IGBT 73 as a switching element, and a diode 83.

The fourth phase VCU 104 possesses the same elements and the same circuit configuration as the third phase VCU 103, and is constituted from a reactor 64, an IGBT 74 as a switching element, and a diode 84.

The SiC-FETs 71, 72 and the IGBTs 73, 74 are subjected to on/off switching controls (duty ratio controls) through the ECU 24 based on the demanded power of the load 30, whereby the FC generated voltage Vfc can be boosted in voltage to the predetermined load terminal voltage Vinv.

With the fuel cell system 12A according to the other embodiment, a configuration is provided in which a passing current Ifc2 of the FCVCU 21A and the temperatures Tc1, Tc2 of the SiC-FETs 71, 72, which serve as switching elements, are provided as control inputs with respect to the ECU 24. Thus, the passing current Ifc2 is detected by a current sensor 80 and is supplied to the ECU 24, together with the temperatures Tc1, Tc2 being detected by temperature sensors 91, 92 and supplied to the ECU 24.

Figure 7:
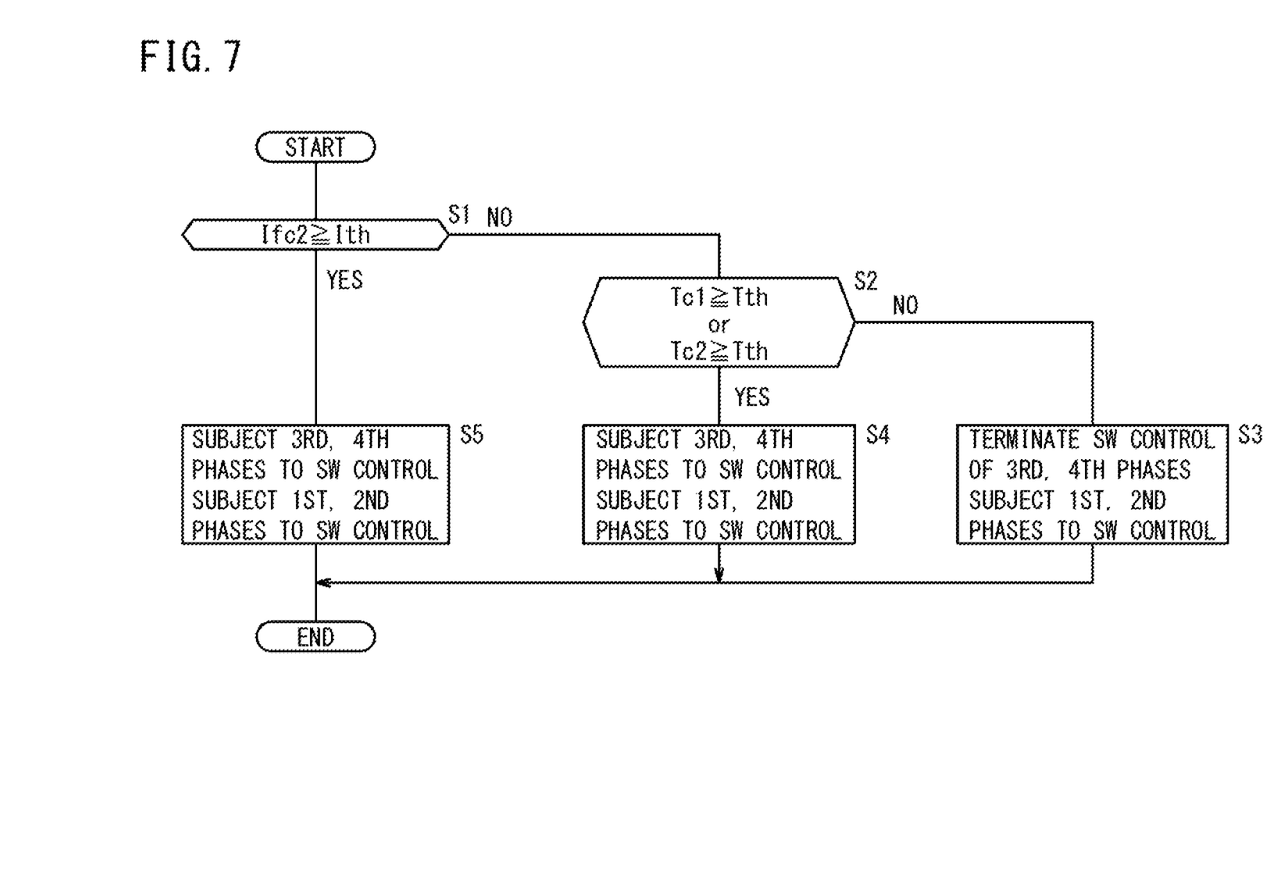
FIG. 7 is a flowchart which is used to provide a description of operations of a two-power-supply load driving fuel cell system according to the other embodiment.

Next, operations of the FCVCU 21A of the fuel cell system 12A according to the other embodiment shown in FIG. 6 will be described with reference to the flowchart of FIG. 7 and the timing charts of FIGS. 8 and 9.

In step S1, the current sensor 80 determines whether or not the passing current Ifc2 flowing to the side of the secondary side 2S from the FCVCU 21A has become greater than or equal to a threshold current Ith (Ifc2≥Ith).

The threshold current Ith, for example, is set to a current value of one-half that of the maximum FC generated current value (rated current value) that is intended to be output from the FC 40.

In the determination of step S1, if the passing current Ifc2 is less than the threshold current Ith (Ifc2<Ith, Step S1: NO), then in step S2, it is determined whether or not at least one of the temperature from among the temperatures Tc1, Tc2 of the SiC-FETs 71, 72 has become greater than or equal to the threshold temperature Tth (Tc1≥Tth or Tc2≥Tth).

In the determination of step S2, if the temperatures Tc1, Tc2 of the SiC-FETs 71, 72 are less than the threshold temperature Tth (Tc1<Tth and Tc2<Tth), more specifically, in the case that the determination of step S2 is negative (step S2: NO), then in step S3, the switching controls of the third phase VCU 103 (IGBT 73) and the fourth phase VCU 104 (IGBT 74) are terminated, and the first phase VCU 101 (SiC-FET 71) and the second phase VCU 102 (SiC-FET 72) are subjected to switching controls.

Figure 8:
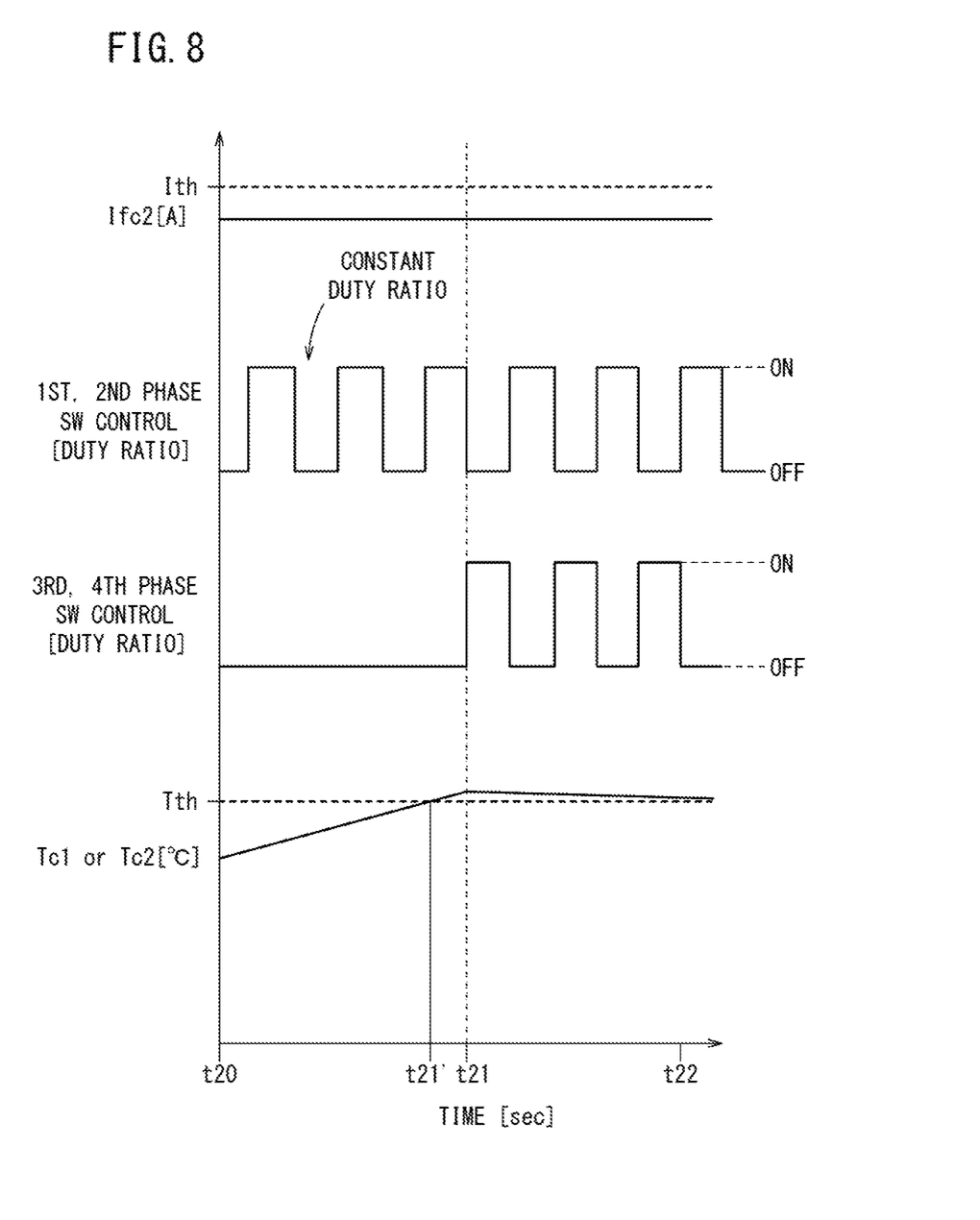
FIG. 8 is a timing chart (at a time of a rise in temperature of switching elements) which is used to provide a description of operations of the two-power-supply load driving fuel cell system according to the other embodiment.

In this case, in one aspect of step S3, as shown by the waveform of the time region from time t20 to time t21' of FIG. 8, in the case that the value of the passing current Ifc2 is a constant value, the SiC-FET 71 and the SiC-FET 72 are subjected to on/off controls at a fixed duty ratio.

Figure 9:
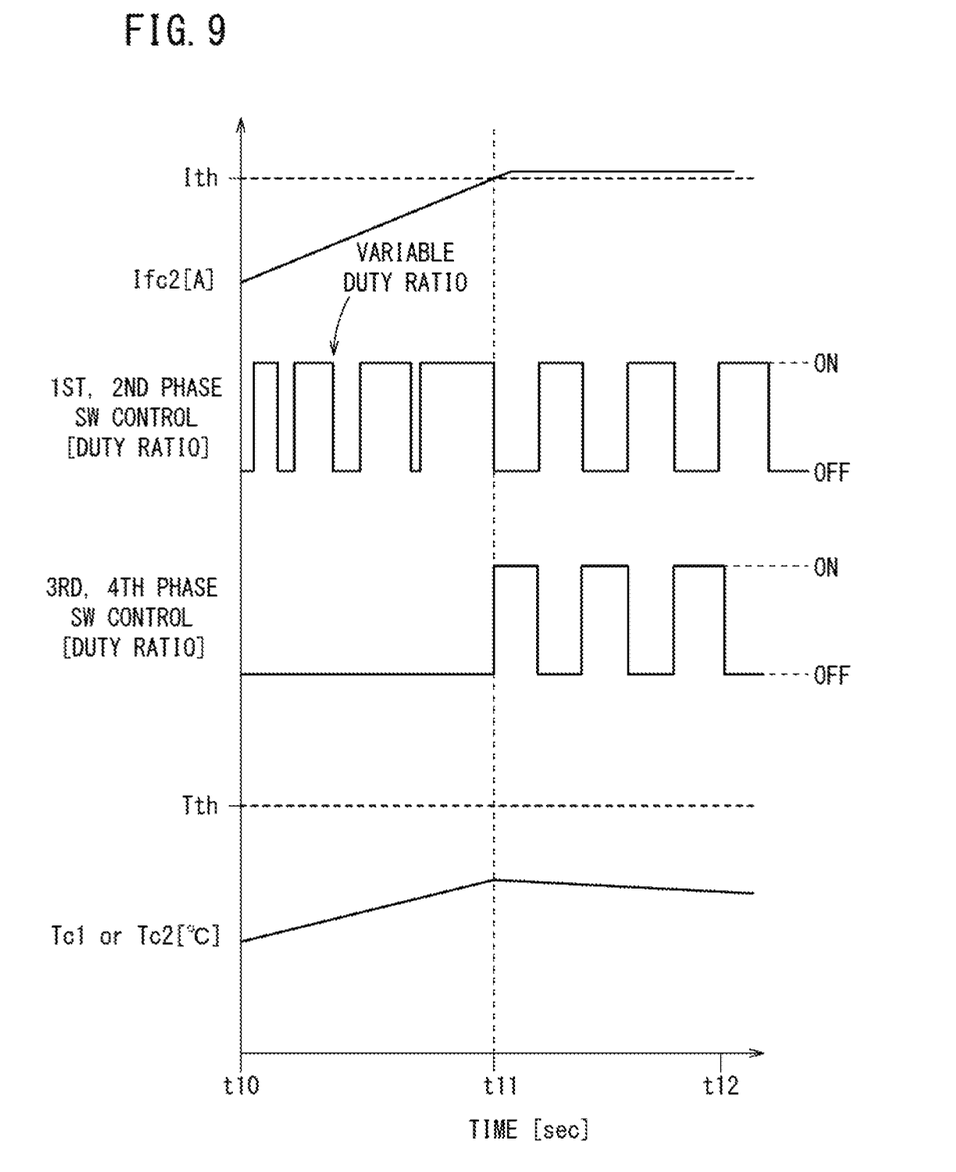
FIG. 9 is a timing chart (at a time of no rise in temperature of the switching elements) which is used to provide a description of operations of the two-power-supply load driving fuel cell system according to the other embodiment.

Further, in another aspect of step S3, as shown by the waveform of the time region from time t10 to time t11 of FIG. 9, in the case that the value of the passing current Ifc2 is rising, the SiC-FET 71 and the SiC-FET 72 are subjected to on/off controls at a variable duty ratio such that the duty ratio thereof increases.

In the determination of step S1, even if the passing current Ifc2 is less than the threshold current Ith (Ifc2<Ith, Step S1: NO), in the case that at least one of the temperatures from among the temperatures Tc1, Tc2 of the SiC-FETs 71, 72 has become greater than or equal to the threshold temperature Tth (Tc1≥Tth or Tc2≥Tth) in step S2, more specifically, if the determination of step S2 is positive (step S2: YES), then in step S4, the first and second phase VCUs 101, 102 (SiC-FETs 71, 72) are subjected to switching controls, together with subjecting the third and fourth phase VCUs 103, 104 (IGBTs 73, 74) to switching controls. More specifically, as shown by the waveforms after time t21 of FIG. 8, the first and second phase VCUs 101, 102 are subjected to switching controls, together with subjecting the third and fourth phase VCUs 103, 104 to switching controls.

On the other hand, in the determination of step S1, in the case that the passing current Ifc2 is greater than or equal to the threshold current Ith (Ifc2≥Ith, Step S1: YES), then regardless of whether or not the temperatures Tc1, Tc2 of the SiC-FETs 71, 72 are greater than or equal to the threshold temperature Tth, in step S5, as shown by the waveforms from time t11 to time t12 of FIG. 9, the first and second phase VCUs 101, 102 are subjected to switching controls, together with subjecting the third and fourth phase VCUs 103, 104 to switching controls at a reverse phase.

SUMMARY OF OTHER EMBODIMENT

The fuel cell system 12A as a two-power-supply load driving fuel cell system according to the above-described other embodiment is a system in which the load 30 is driven by the FC 40 and the BAT 20 (electrical storage device). The fuel cell system 12A is equipped with the FCVCU 21A as a first power conversion device that is disposed at the output terminals of the FC 40, and the BATVCU 22 as a second power conversion device that is disposed at the terminals of the BAT 20.

In this case, the FCVCU 21A is constituted by switching elements made up from, the SiC-FETs 71, 72 and the IGBTs 73, 74, and the BATVCU 22 is constituted by switching elements made up from the IGBTs 41 to 44. The maximum current value of the FC 40 (Imax [A] in FIG. 3) is set to be higher than the maximum current value of the BAT 20 (Imax [A] in FIG. 3), and furthermore, in a predetermined driving mode, i.e., in the LA-4 driving mode according to the present embodiment, the average passing power value (Pbave in FIG. 5) of the BATVCU 22 (IGBTs 41 to 44) is set to be higher than the average passing power value (Pfcave in FIG. 5) of the FCVCU 21A.

In addition, a configuration is provided so that, at a time that the load 30 is a low load (Ifc2<Ith, step S1: NO), only the SiC-FETs 71, 72 of two phases of the first phase VCU 101 and the second phase VCU 102 are placed in an operating state (step S3, time t10 to time t11 of FIG. 9), and at a time that the load 30 is a high load (Ifc2≥Ith, step S1: YES, step 35), both the SiC-FETs 71, 72 and the IGBTs 73, 74 of four phases of the first phase VCU 101 through the fourth phase VCU 104 are placed in an operating state. Therefore, at a time of low load, the output power (FC generated power Pfc) of the FC 40 is controlled so as not to vary, for example, from the lower limit power (steady FC power Pfcm), whereas at a time of high low, the IGBTs 73, 74 also are operated, and thus, a large power can be supplied at low cost from the FC 40 to the load 30.

Further, even if the load 30 is a low load (Ifc<Ith: Step S1: NO), in the case that at least one of the temperatures from among the temperatures Tc1, Tc2 of the SiC-FETs 71, 72 has become greater than or equal to the threshold temperature Tth (Tc1≥Tth or Tc2≥Tth, step S2: YES), since a configuration is provided in which both the SiC-FETs 71, 72 and the IGBTs 73, 74 of four phases of the first phase VCU 101 through the fourth phase VCU 104 are placed in an operating state (time t21' to time t22, step S4), deterioration or failure of the SiC-FETs 71, 72 due to generation of heat can be prevented.

The present invention is not limited to the embodiments described above, and based on the disclosed content of the present specification, it is a matter of course that a variety configurations may be adopted therein.

The invention claimed is:

1. A two-power-supply load driving fuel cell system installed in a fuel cell vehicle, wherein a load including a drive motor is driven by a fuel cell and an electrical storage device, comprising:

a first power conversion device disposed at output terminals of the fuel cell; and a second power conversion device disposed at terminals of the electrical storage device;

wherein:

the first power conversion device is constituted by a switching element including a silicon carbide field effect transistor referred to as an SiC-FET;

the second power conversion device is constituted by a switching element made up from an insulated gate bipolar transistor referred to as an IGBT;

a maximum current value of the fuel cell is set to be higher than a maximum current value of the electrical storage device; and furthermore, in an LA-4 driving mode, a voltage value of the fuel cell is set to be lower than a voltage value of the electrical storage device, and an average passing power value of the second power conversion device is set to be higher than an average passing power value of the first power conversion device, wherein:

a lower limit power is set in the fuel cell;

when a demanded power of the load is less than or equal to the lower limit power, a generated power of the fuel cell is the lower limit power, and responsive to a variation in the demanded power of the load, a charging power to the electrical storage device is changed; and whereas, in a case that the demanded power of the load exceeds the lower limit power, the first power conversion device is controlled so that the generated power of the fuel cell is synchronized with the variation in the demanded power of the load.

2. The two-power-supply load driving fuel cell system according to claim 1, wherein the lower limit power is set to a value that is less than or equal to the average passing power value of the second power conversion device.

3. The two-power-supply load driving fuel cell system according to claim 1, wherein the first power conversion device is constituted by a switching element including an IGBT in addition to the SiC-FET, and is controlled so that, when the load is a low load, only the SiC-FET switching element is placed in an operating state, and when the load is a high load, both the SiC-FET switching element and the IGBT switching element are placed in an operating state.

4. The two-power-supply load driving fuel cell system according to claim 3, wherein, even when the load is a low load, in a case that the temperature of the SiC-FET switching element is greater than or equal to a threshold temperature, both the SiC-FET switching element and the IGBT switching element are controlled so as to be placed in an operating state.

5. The two-power-supply load driving fuel cell system according to claim 1, wherein in the case that the demanded power of the load exceeds the lower limit power, the first power conversion device is controlled so that the generated power of the fuel cell is instantaneously increased in accordance with the variation in the demanded power of the load.

* * * * *